Dec. 23, 1958 H. H. GURSTELLE ET AL 2,865,363
DEVICE FOR CRACKING FROZEN MULTIPLE CONFECTIONS
Filed Feb. 24, 1956
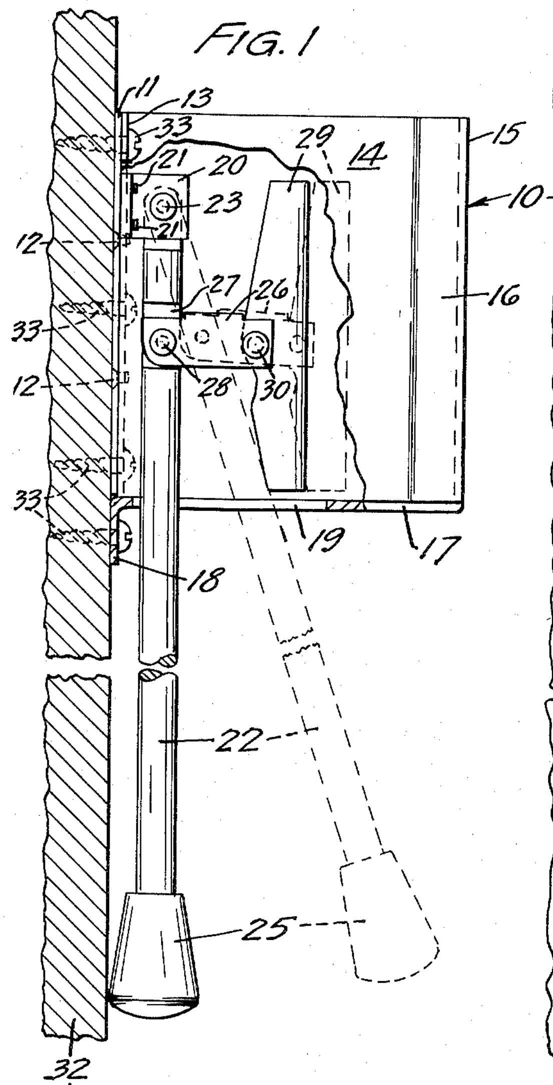
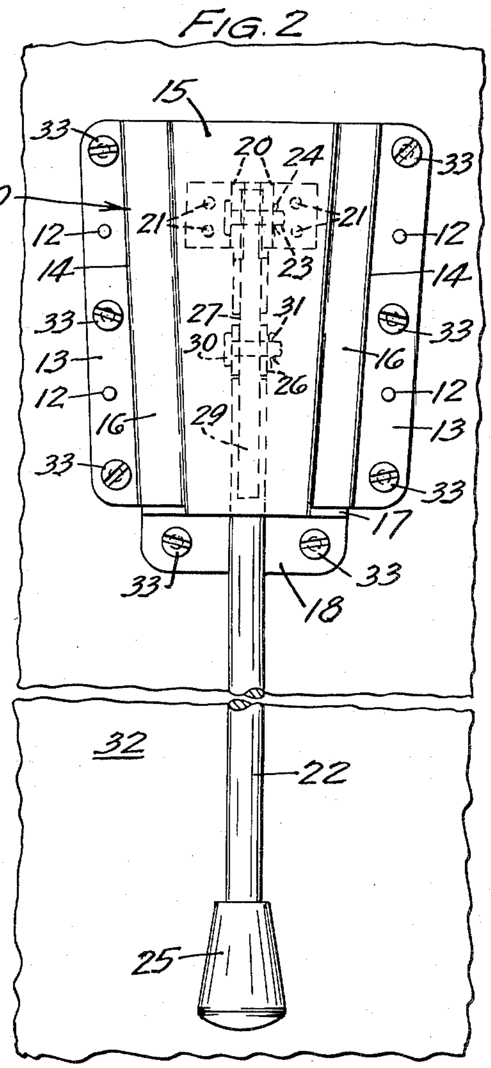
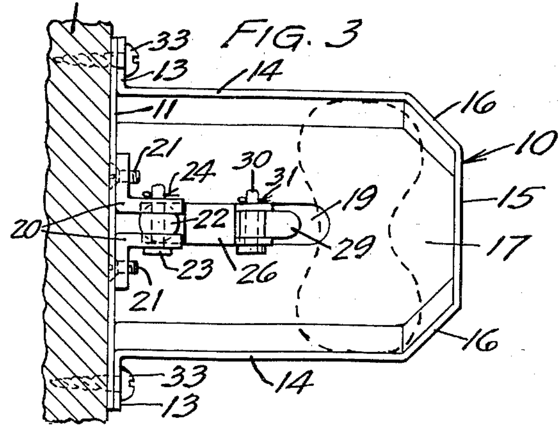
INVENTORS
HAROLD H. GURSTELLE
SIDNEY G. BURTON
BY
Stanley G. DeLoHunt
AGENT United States Patent Office 2,865,363
Patented Dec. 23, 1958

2,865,363

DEVICE FOR CRACKING FROZEN MULTIPLE CONFECTIONS

Harold H. Gurstelle and Sidney G. Burton, St. Paul, Minn.

Application February 24, 1956, Serial No. 567,517

6 Claims. (Cl. 125—23)

The present invention relates to novel devices for use in connection with molded confections, which confections are formed for convenience into a plurality of more or less equal portions, but which prior to consumption must be cracked into the several portions. More particularly, our invention relates to devices for easily and accurately mechanically cracking such confections into the several predetermined portions.

Frozen confections are generally molded about a stick or handle which protrudes from one end thereof. They may be then consumed without the necessity of handling the edible portion, which quickly melts upon exposure to the warmth of the hands. Often, two or more frozen confections, each with its own handling stick, are supplied in one retail package. For convenience in formation, packaging and shipping, these multiple confections are generally molded into an integral unit. A thin portion or bridge of confection connects the several components and unifies the multiple confection. One such frozen multiple confection is the molded frozen twin confection known by the trade name "Popsicle."

Prior to consumption it is necessary and desirable to break these multiple confections along the connecting bridges into their several components. When broken manually, they often break elsewhere than at the connecting bridges. One or more pieces result which do not contain handling sticks. To attempt to consume these portions of the confection is messy and inconvenient. On the other hand, to throw away the improperly cracked pieces is costly and wasteful, particularly where the retail vendor or manufacturer is the one who stands the loss.

It is therefore an object of the present invention to provide novel means with which multiple confections are accurately broken along the length of confection bridges connecting the several components. Another object of the present invention is to provide a novel inexpensive device for accurately mechanically cracking molded twin confections easily, safely and in a sanitary manner into two approximately equal halves.

In accomplishing these and other objects and advantages we provide a support for receiving the frozen confection. An elongate breaking bar is tiltably disposed opposite the support. Combination lever and linkage means are connected with the breaking bar by which the bar is tiltably moved toward and away from the support and, which, when actuated cause the breaking bar uniformly to apply cracking forces over its length to a multiple confection in supported position for cracking at the birdge connecting the several components of said confection.

A preferred embodiment of the present invention will now be illustrated with the aid of the accompanying drawings, in which:

Figure 1 is a side view partially cut away of a device of the present invention positioned on a wall panel;

Figure 2 is a view in elevation of the device shown in Figure 1; and

Figure 3 is an end view of the device shown in Figures 1 and 2 looking into the open end in which the frozen multiple confection is inserted.

Referring now to the accompanying drawings, wherein like reference characters refer to corresponding parts in the several views, a cover 10 is affixed to a base 11, preferably consisting of metal, by means of flat-head bolts 12. The bolts 12 extend through the countersunk holes in the base 11, with the bolt head surfaces fitting flush with the under surface of the base, and are turned into tapped holes in the side flanges 13 of the cover 10.

The cover 10, formed from a single piece of metal, includes a pair of side walls 14 at the base edges of which are attached the aforesaid flanges 13, a top 15 having convergent side edges and corner walls 16 which join the top 15 and the said side walls 14. The side walls 14, though extending perpendicularly with respect to the top 15, are in convergent, i. e. non-parallel, relation. Attached to the narrow end of the top 15 is end wall 17 to the base edge of which, in turn, is attached end flange 18. The configuration of end wall 17 is such that its edges terminate flush with the exterior surfaces of the side walls 14 and corner walls 16, thus neatly closing off the narrow end of the cover 10. An elongate opening 19 is provided in the end wall 17 which extends perpendicularly with respect to the top 15 approximately mid-way between the side walls 14.

Affixed to the base 11 centrally of the side walls 14 adjacent the wide open end of the cover 10 are a pair of opposed spaced angles 20 which together form a bracket. The angles are retained to the base 11 with the aid of bolts 21 in the manner described above in connection with the attachment of the cover 10 to the base 11 by means of bolts 12. Aligned holes are provided in the extending portions of the angles 20 which serve a function to be described presently.

Extending from beyond the narrow end of the cover 10 through the elongate opening 19 and approximately midway between the said walls 14 is an elongate lever 22, one end of which passes between the extended portions of the angles 20. A pin 23 extends through the aforementioned aligned holes in the angles and through the lever 22 to thereby pivotally affix the latter. A cotter pin 24 extending through the exposed end of the pin 23 retains the pin in place. The free end of the lever 22 is provided with a knob 25 by which the lever may be pivoted, about the pivoting pin 23, toward and away from the top 15 within the limits permitted by the length of the elongated opening 19.

Attached to the lever 22 a short distance from the pivotally affixed end is a connecting linkage 26. Said linkage consists of a U-shaped piece of metal. The side sections of the linkage 26 extend beyond the middle or connecting section to form a pair of parallel ears on each end. The linkage fits over a flattened portion 27 of the lever 22 in a position approximately perpendicular with respect to the lever 22 in a plane perpendicular with respect to the base 11. A pin 28 which passes through one ear, through the lever, and thence through the other ear affixes the linkage 26 to the lever 22. Pin 28, in turn, is retained in position by a cotter pin (not shown). The linkage 26 is prevented from extensive pivoting with respect to the lever 22, and thus collapsing, in the one direction (counter-clockwise in Figure 1) by the connecting section of the linkage and in the other direction by the edge of said flattened portion 27 nearest the free edge of lever 22.

An elongate breaking bar 29 is pivotally affixed about its mid-portion to the other end of the connecting linkage 26 between the other pair of ears by means of a pin 30 which extends through the ears and the breaking bar. A cotter pin 31 passing through the exposed end of the pin 30 removably retains the latter in position. Thus the breaking bar 29 is disposed in a plane situated approximately mid-way between the side walls 14. As may be seen from Figure 3, the long edge of the breaking bar facing the top 15 is rounded off. For a purpose to be hereinafter pointed out the breaking bar 29 is permitted to pivot somewhat with respect to the linkage 26 in the counter clockwise direction (Figure 1) before being stopped by the connecting section of the linkage and to pivot unrestrictedly in the clockwise direction. It thus may be tilted with respect to the linkage 26 so as to remain approximately parallel with respect to the top 15 as the lever 22 is raised and lowered toward and away from the top 15.

Our novel device may, for ease in operation, be mounted on a wall 32 or other panel, either vertically, as shown, or otherwise, by means of a series of screws 33 some of which extend into the wall through the sidewall flanges 13 and the base 11 and the remainder of which extend through the end wall flange 18.

In being employed to accurate crack frozen twin confections our device operates in the following manner: With the lever 22 in the position furtherest away from the top 15 such that knob 25 is in contact with the wall 32, a frozen twin confection is inserted into the upper portion of the cover 10 between the breaking bar 29 and the top 15 from the open wide end of the cover and is wedged into supported position between the convergent side walls 14 as shown in Figure 3. The distance between the side walls 14 at the small enclosed end of cover 10 is thus less than, while the distance between them at the other end of cover 10 is greater than, the width of the confection. The corner walls 16 serve to prevent the confection from coming into contact with the top 15 thereby causing the confection to be supported substantially entirely from its side edges and lessening the amount of cracking force needed to break the confection along the connecting bridge which connects the two halves.

The knob 25 is then grasped and the lever 22 is pivoted away from the wall 32 about the pin 23 toward the top 15. Advanced therewith through connecting linkage 26 toward the top 15 is the elongate breaking bar 29, which is sufficiently narrow to pass easily between the confection halves. As the breaking bar comes into contact with the confection bridge connecting the two confection halves it pivots or tilts about the pin 30 until it substantially uniformly contacts the connecting bridge over the entire length of the breaking bar 29. Thus approximately uniform cracking forces are exerted along the entire length of the breaking bar against the bridge irrespective of whether or not the confection has been positioned within the support exactly equidistantly along its length from the top 15. As the lever 22 is pivoted somewhat further away from the wall 32 (toward the top 15), the breaking bar 29 is displaced further toward the top 15 uniformly exerting ever increasing cracking forces along at least the greater portion of the length of the connecting bridge as it moves until the confection is broken cleanly into halves along said connecting bridge. The lever 22 is then returned to the initial position carrying with it the breaking bar 29 thereby permitting removal of the cracked twin confection from the cover 10.

The confections need not be removed during the cracking operations from the thin protective paper wrappings in which they are customarily contained. Nor are the paper wrappings ruptured during the cracking operations, particularly where the breaking bar 29 has somewhat of a rounded edge. Hence, no portion of the confections are ever in contact with any part of the device. Our device therefore is safe and sanitary.

Very little physical force is required to crack the confections. Of course, the mechanical advantage derived with our device, will vary according to the length of the lever 22 employed, the distance between the point of affixation of the linkage 22 and the lever pivot point, the manner in which the confection is supported (i. e. whether only from the side edges) etc. In the embodiment shown the length of the lever 22 from the pin 23 is about 10 inches. The distance between the pin 23 and the pin 28 is about two inches. In this device we have found that the confections are cracked often upon application of as little as one to two pounds force or less to the end of the lever 22. Even a very young child may therefore operate our device.

It will, of course, be apparent that the embodiment of our invention specifically shown and described has other uses than the cracking of frozen multiple confections and, as well, as numerous equivalents, all of which are contemplated. For example, the breaking bar 29 may be disposed so as to slide laterally with respect to the side walls to thereby render the device suitable for cracking objects not intended to be broken into equal halves. Or, if desired, more than a single breaking bar may be employed.

We therefore do not intend to be limited by the illustrative embodiments shown. Rather, all variations and modifications of the disclosure which come within the appended claims and/or are novel over the prior art are comprehended as being within the scope of our invention.

We claim:

1. A device suitable for cracking frozen multiple confections into their several component portions along the confection bridges connecting said portions, said device comprising support means including a rigidly positioned lengthwise extending suspending member on each side thereof for supporting a frozen multiple confection in breaking position with adjacent component portions of said confection resting one each against one of said suspending members, an elongate breaking bar tiltably disposed opposite said support means in a plane passing therethrough approximately mid-way between said suspending members, and combination lever and linkage means connected to said breaking bar for tiltably moving the latter within said plane toward and away from said support means, said suspending members being non-yielding to forces exerted thereagainst through action by said breaking bar upon a multiple confection positioned on said suspending members.

2. A device suitable for cracking frozen twin confections into two approximately equal halves along the confection bridge connecting the said halves, said device comprising support means including a rigidly positioned length-wise extending suspending member on each side thereof for supporting a frozen twin confection in breaking position with each of said halves resting against one of said suspending members, an elongate bar tiltably disposed opposite said support means in a plane passing therethrough approximately mid-way between said suspending members, and combination lever and linkage means connected to said breaking bar for tiltably moving the latter within said plane toward and away from said support means, said suspending members being non-yielding to forces exerted thereagainst through action by said breaking bar upon a twin confection positioned on said suspending members.

3. A device suitable for cracking frozen twin confections into two approximately equal halves along the confection bridge connecting the said halves, said device comprising: a support including a pair of convergent side walls between which a frozen twin confection to be cracked may be wedged and supported; an elongate breaking bar disposed opposite said support in a plane passing through said support approximately mid-way between said side walls; and combination lever and linkage means connected to said breaking bar for moving the latter within said plane toward and away from said support means.

4. A device suitable for cracking frozen twin confections into two approximately equal halves along the confection bridge connecting the said halves, said device comprising: a support which includes a top, a pair of convergent side walls between which a frozen twin confection to be cracked may be wedged and supported, and a pair of narrow corner walls connecting said top and side walls by which an uncracked frozen twin confection wedged between said side walls is prevented from contacting said top; an elongate breaking bar disposed opposite said support in a plane passing through said support approximately mid-way between said side walls; and combination lever and linkage means connected to said breaking bar for moving the latter within said plane toward and away from said support means.

5. A device suitable for cracking frozen twin confections into two approximately equal halves along the confection bridge connecting the said halves, said device comprising: a support which includes a top, a pair of convergent side walls between which a frozen twin confection to be cracked may be wedged and supported, and a pair of narrow corner walls connecting said top and side walls by which an uncracked frozen twin confection wedged between said side walls is prevented from contacting said top; an elongate breaking bar tiltably disposed opposite said support in a plane passing through said support approximately mid-way between said side walls; and combination lever and linkage means connected to said breaking bar for tiltably moving the latter within said plane toward and away from said support.

6. A device suitable for cracking frozen twin confections into two approximately equal halves along the confection bridge connecting the said halves, said device comprising: a base; a cover affixed to said base including a top, a pair of convergent side walls perpendicular to said top between which a frozen twin confection to be cracked may be wedged and supported, and a pair of narrow corner walls connecting said top and side walls by which an uncracked frozen twin confection wedged between said side walls is prevented from contacting said top; a lever pivotally affixed to said base adjacent the wide end of said cover extending within said cover mid-way between said side walls and beyond the narrow end of said cover; a linkage affixed to said lever at a point spaced a relatively short distance from said pivot point and extending toward said top in a plane perpendicular thereto; and an elongate breaking bar pivotally affixed to said linkage about its mid-point within said plane, whereby upon movement of said lever about its pivot toward and away from said top said breaking bar moves tiltably within said plane correspondingly toward and away from said top.

References Cited in the file of this patent

UNITED STATES PATENTS

| | | |
|---|---|---|
| 600,856 | Brinkman | Mar. 22, 1898 |
| 812,973 | Barr et al. | Feb. 20, 1906 |
| 1,873,721 | Postley | Aug. 23, 1932 |

FOREIGN PATENTS

| | | |
|---|---|---|
| 830,473 | Germany | Feb. 4, 1952 |
| 832,279 | France | June 27, 1938 |